US009284032B1

(12) United States Patent
Snyder et al.

(10) Patent No.: US 9,284,032 B1
(45) Date of Patent: Mar. 15, 2016

(54) THEFT DETERRENCE SYSTEM AND METHOD FOR MARINE VESSELS

(75) Inventors: Matthew W. Snyder, Fond du Lac, WI (US); Thomas S. Kirchhoff, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 367 days.

(21) Appl. No.: 13/605,566

(22) Filed: Sep. 6, 2012

Related U.S. Application Data

(60) Provisional application No. 61/541,599, filed on Sep. 30, 2011.

(51) Int. Cl.

| | |
|---|---|
| G08B 23/00 | (2006.01) |
| B60Q 1/00 | (2006.01) |
| B60R 25/10 | (2013.01) |
| G08B 1/08 | (2006.01) |
| B60L 3/00 | (2006.01) |
| B60L 15/00 | (2006.01) |
| G05D 1/00 | (2006.01) |
| G05D 3/00 | (2006.01) |
| G06F 7/00 | (2006.01) |
| G06F 17/00 | (2006.01) |
| B63H 21/22 | (2006.01) |
| B63H 23/00 | (2006.01) |
| E05B 17/00 | (2006.01) |
| B63H 21/21 | (2006.01) |
| B60R 25/04 | (2013.01) |
| B63H 20/00 | (2006.01) |
| F02B 61/04 | (2006.01) |
| B60R 25/045 | (2013.01) |
| B60R 25/102 | (2013.01) |
| G07C 5/00 | (2006.01) |

(Continued)

(52) U.S. Cl.
CPC ............... *B63H 21/21* (2013.01); *B60R 25/04* (2013.01); *B60R 25/045* (2013.01); *B60R 25/102* (2013.01); *B63H 21/213* (2013.01); *B63H 21/26* (2013.01); *F02B 61/045* (2013.01); *G07C 5/008* (2013.01); *B63B 2017/0009* (2013.01); *B63B 2201/26* (2013.01); *B63H 21/24* (2013.01); *G05D 1/0206* (2013.01); *Y02T 10/7077* (2013.01)

(58) Field of Classification Search
USPC ......... 340/984, 425.5, 426.1, 426.11, 426.13, 340/539.1, 539.11; 70/21, 29–35
See application file for complete search history.

(56) References Cited

U.S. PATENT DOCUMENTS

| | | | |
|---|---|---|---|
| 6,880,784 B1 * | 4/2005 | Wilkinson et al. | .......... 244/76 R |
| 6,933,884 B2 | 8/2005 | Martin et al. | |

(Continued)

*Primary Examiner* — Mohamed Barakat
(74) *Attorney, Agent, or Firm* — Andrus Intellectual Property Law, LLP

(57) ABSTRACT

A control system and method for deterring theft of a marine vessel. A security control circuit receives a transponder identification code from a transponder. The engine control circuit has a status that is based on a comparison of a stored identification code with the transponder identification code. The status of the engine control circuit is locked if the stored identification code does not match the transponder identification code and the status of the engine control circuit is unlocked if the stored identification code does match the transponder identification code. The security control circuit determines an arbitrated lock status of the control system based on a conjunctive analysis of the locked and unlocked statuses of a plurality of engine control circuits connected to a network bus, and indicates the arbitrated lock status to an operator of the marine vessel.

46 Claims, 4 Drawing Sheets

(51) Int. Cl.
 *B63H 21/00* (2006.01)
 *G05D 1/02* (2006.01)
 *B63B 17/00* (2006.01)

(56) References Cited

U.S. PATENT DOCUMENTS

| | | | |
|---|---|---|---|
| 7,164,213 B2 * | 1/2007 | Yoshimura et al. | 307/10.2 |
| 7,612,668 B2 * | 11/2009 | Harvey | 340/550 |
| 8,237,542 B2 * | 8/2012 | Katagiri | 340/5.6 |
| 2006/0176193 A1 | 8/2006 | Wraight | |
| 2010/0045487 A1 * | 2/2010 | Bamba | 340/984 |
| 2010/0048068 A1 * | 2/2010 | Bamba | 440/1 |
| 2010/0049385 A1 | 2/2010 | Bamba | |
| 2010/0049386 A1 * | 2/2010 | Bamba | 701/21 |
| 2010/0049387 A1 | 2/2010 | Aoki | |
| 2010/0305789 A1 * | 12/2010 | Ito | 701/21 |
| 2011/0230165 A1 * | 9/2011 | Kleve et al. | 455/411 |

* cited by examiner

THEFT DETERRENCE SYSTEM AND METHOD FOR MARINE VESSELS

CROSS-REFERENCE TO RELATED APPLICATION

The present utility application claims the benefit of and priority to U.S. Provisional Patent Application No. 61/541,599, filed Sep. 30, 2011, which is incorporated herein by reference in entirety.

FIELD

The present disclosure relates to theft deterrence systems and methods for marine vessels. Specifically, the present disclosure relates to theft deterrence systems and methods for marine vessels having a plurality of marine engines.

BACKGROUND

U.S. Patent Application Publication No. 2010/0049385 discloses a theft deterrent apparatus in a marine vessel including a propulsion device having an engine coupled to a starter and a power generator. An authentication unit is arranged to operate by receiving power from a battery that is arranged to supply power to the starter and accumulate power generated by the power generator. An operation control unit is arranged to allow operation of the propulsion device if authentication by the authentication unit does succeed and prohibit operation of the propulsion device if authentication by the authentication unit does not succeed. A fault detection unit is arranged to detect a fault of the authentication unit. A fault detection control unit is arranged to make a provisional fault judgment when the fault detection unit detects the fault of the authentication unit before completion of engine starting by the starter, and then make the fault detection unit perform the fault detection again after the completion of engine starting by the starter.

U.S. Patent Application Publication No. 2010/0049386 discloses a theft deterrent apparatus is used in a marine vessel which includes a propulsion device. The theft deterrent apparatus includes an authentication unit, a fault detection unit arranged to detect a fault of the authentication unit, and an operation control unit arranged to control operation of the propulsion device. When the authentication unit is normal, the operation control unit controls the operation of the propulsion device in accordance with an authentication result of the authentication unit. When a fault has occurred in the authentication unit, the operation control unit controls the operation of the propulsion device without referring to the authentication result of the authentication unit. When the authentication unit is normal, the operation control unit sets an operation mode of the propulsion device to an ordinary operation mode under a condition of success of authentication by the authentication unit and prohibits the operation of the propulsion device if the authentication by the authentication unit does not succeed. When a fault has occurred in the authentication unit, the operation control unit sets the operation mode of the propulsion device to an emergency operation mode in which a predetermined restriction is applied with respect to the ordinary operation mode.

U.S. Pat. No. 6,933,884 discloses a system for remotely tracking, monitoring and messaging vessels utilizing a global positioning system satellite constellation, having a transceiver located on the vessel to be tracked and monitored, a monitoring center located remote from the vessel, a communications means allowing the bi-directional communication between the transceiver and the monitoring center, a communications means allowing the uni-directional communication from the global positioning system satellite constellation to the transceiver, sensors on the on-board systems of the vessel, a communications means allowing communication between the sensors and the transceiver, an input/output means for messaging, and a communications means allowing communication between the input/output means and the transceiver.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Disclosed is a control system for deterring theft of a marine vessel having a plurality of engine control circuits that are selectively connectable to a network bus, each engine control circuit controlling operation of a respective marine engine in a plurality of marine engines. The control system comprises a security control circuit that receives a first transponder identification code from a first transponder. Each engine control circuit has a first stored identification code. Each engine control circuit that is connected to the network bus has a status that is based on a comparison of the first stored identification code with the first transponder identification code. The status of the engine control circuit is locked if the first stored identification code does not match the first transponder identification code and the status of the engine control circuit is unlocked if the first stored identification code does match the first transponder identification code. The security control circuit determines an arbitrated lock status of the control system that is based on a conjunctive analysis of the locked and unlocked statuses of the engine control circuits in the plurality that are connected to the network bus, and indicates the arbitrated lock status to an operator of the marine vessel.

Also disclosed is a method for deterring theft of a marine vessel having a plurality of engine control circuits that are selectively connectable to a network bus and that control operation of a respective marine engine in a plurality of marine engines. The method comprises receiving with a security control circuit a transponder identification code from a transponder and determining a status of the engine control circuit based on a comparison of an identification code stored in the respective engine control circuit with the transponder identification code. The status of the engine control circuit is locked if the stored identification code does not match the transponder identification code and the status of the engine control circuit is unlocked if the stored identification code does match the transponder identification code. The method further comprises determining an arbitrated lock status of the control system that is based on a conjunctive analysis of the locked and unlocked statuses of the engine control circuits of the plurality that are connected to the network bus and indicating the arbitrated lock status to an operator of the marine vessel.

Also disclosed is a control system for deterring theft of a marine vessel having an engine control circuit controlling operation of a respective marine engine. The control system comprises a security control circuit that receives a transponder identification code from a transponder. The engine control circuit has a stored identification code. The engine control circuit has a status that is based on a comparison of the stored identification code with the transponder identification code. The status of the engine control circuit is locked if the stored identification code does not match the transponder identification code and the status of the engine control circuit is unlocked if the stored identification code does match the transponder identification code. A telematics circuit establishes a virtual geographical perimeter around the marine vessel when the status of the engine control circuit is not unlocked and removes the virtual geographical perimeter when the status of the engine control circuit is unlocked.

Also disclosed is a method for deterring theft of a marine vessel having an engine control circuit that controls operation of a respective marine engine. The method comprises receiving with a security control circuit a transponder identification code from a transponder and determining a status of the engine control circuit based on a comparison of an identification code stored in the engine control circuit with the transponder identification code. The status of the engine control circuit is locked if the stored identification code does not match the transponder identification code and the status of the engine control circuit is unlocked if the stored identification code does match the transponder identification code. The method further comprises establishing a virtual geographical perimeter around the marine vessel with a telematics circuit when the status of the engine control circuit is not unlocked and removing the virtual geographical perimeter when the status of the engine control circuit is unlocked.

BRIEF DESCRIPTION OF THE DRAWINGS

Examples of theft deterrence systems and methods for marine vessels are described with reference to the following figures. The same numbers are used throughout the figures to reference like features and components.

DETAILED DESCRIPTION

Figure 1:
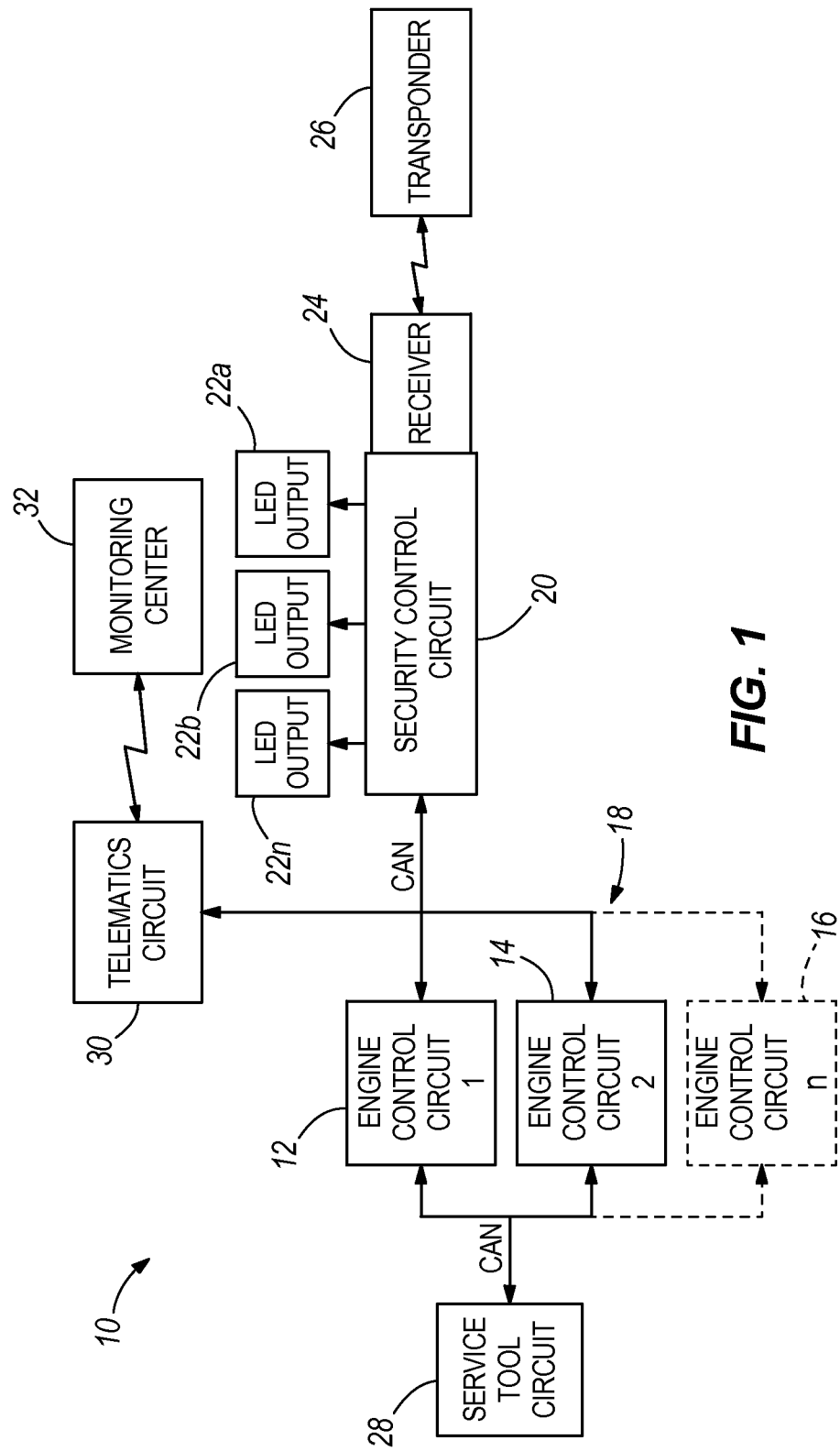
FIG. 1 is a schematic view of a control system for deterring theft of a marine vessel according to the present disclosure.

In the present description, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

The present disclosure results from the present inventors' research and development of theft deterrence systems and methods for marine vessels. While attempting to apply radio frequency identification (RFID) technology to a marine vessel control system, the present inventors recognized the unique challenges presented by multiple engines with multiple engine control circuits on a single marine vessel. Any one engine control circuit on the marine vessel begins with a status of locked, meaning its respective marine engine cannot operate at full power, despite being turned on. The presence of an RFID transponder having a unique identification code may unlock the engine control circuit and allow normal operation of the respective marine engine. Other marine engines on the marine vessel however may remain locked for various reasons, for example if their engine control circuits do not have a matching unique identification code, and to deter theft of the marine vessel each marine engine may remain constrained to operate at a low power output.

The present inventors therefore developed a system and method for determining the locked or unlocked status, as further described herein below, for the entire marine vessel. The present inventors realized that it would also be desirable to indicate to the operator the overall locked or unlocked status of the marine vessel, taking into account all of the statuses of each individual engine control circuit. In this way, the operator will be able to see whether the marine vessel is capable of normal operation. The present investors also recognized that such a system and method could optionally be provided by a control circuit separate from the marine vessel engine control circuit(s). As such, the present system and method can be integrated into an already existing marine vessel control system. Further, the present system and method are capable of controlling multiple marine engines that may or may not be installed on the marine vessel and may or may not be turned on at a given point in time.

The present inventors further recognized the need for the control system to allow normal operation of the marine vessel once the engine control circuits have been unlocked until the marine engines are shut off and the control system is reset for another trip. In this way, the operator of the marine vessel will not be stranded should the control system malfunction in open water.

As shown in FIG. 1, a marine vessel control system 10 according to the present disclosure includes at least a first engine control circuit 12. The control system 10 may also include a second engine control circuit 14. In other embodiments, the control system 10 comprises a number of engine control circuits such as, for example, an $n^{th}$ engine control circuit 16. Each engine control circuit 12, 14, 16, controls operation of a respective marine engine in a plurality of marine engines (not shown). The plurality of engine control circuits may be located at or near the marine engine with which they are associated, or they may be located remotely of the marine engine, such as at a helm of the marine vessel. In this way, there may be one or more engine control circuits controlling operation of a respective marine engine. Each engine control circuit 12, 14, 16 may include a processor, a memory, and an input/output interface. The plurality of engine control circuits 12, 14, 16 are selectively connectable to a network bus 18. Network bus 18 can be, for example, a controller area network (CAN) bus.

Also connected via the CAN bus 18 is a security control circuit 20, which may include a processor, a memory, and an input/output interface. The security control circuit 20 can be provided as a component separate from the engine control circuits 12, 14, 16 and/or can optionally be provided separate from the marine vessel. In other embodiments, the security control circuit 20 can be provided as part of one or more of the engine control circuits 12, 14, 16. The security control circuit 20 is connected to one or more indicators 22a, 22b, 22n which can be, for example, LED outputs. Other indicators 22a-22n could be provided, such as displays, audio speakers, and/or the like. The security control circuit 20 may also include a receiver 24, such as for example, an antenna. Other receivers could be provided, such as if a different communication technology other than RFID technology is implemented.

The security control circuit 20 receives a first transponder identification code from a first transponder 26 presented by a user when startup of the control system 10 is desired. The first transponder 26 may be, for example, located in a fob that is inserted into the dash of the marine vessel. The first transponder could also be located in a key. The first transponder identification code may be, for example, a string of numbers and/or letters unique to the first transponder 26. The security control circuit 20 may receive the first transponder identification code from the first transponder 26 via an RFID transmission from the first transponder 26 to the receiver 24 connected to security control circuit 20. The present disclosure also contemplates technologies other than RFID communication that may be used and still fall within the scope of the appended claims. For example, the first transponder 26 and the receiver 24 could communicate using bluetooth communication with a standalone device, bluetooth communication with a user's cell phone, or near field communication. The security control circuit 20 may relay the first transponder identification code to each engine control circuit 12, 14, 16 that is connected to the network bus 18.

The engine control circuits 12, 14, 16 each have a first stored identification code. The first stored identification code may be stored by the engine control circuits 12, 14, 16 as described further herein below.

The control system 10 may include a service tool circuit 28, the purpose and function of which will be discussed further herein below. The control system 10 may also include a telematics circuit 30 connectable via the CAN bus 18 to the engine control circuits 12, 14, 16 and to the security control circuit 20. The telematics circuit 30 may communicate with a monitoring center 32, the purpose and function of which will be described further herein below.

The security control circuit 20 may also receive from a second transponder (not shown) a second transponder identification code that is different than the first transponder identification code. In this case, each engine control circuit 12, 14, 16 has a second stored identification code. The first and second transponder identification codes are stored by the engine control circuits 12, 14, 16 as first and second stored identification codes, respectively, during set up of the control system 10. This is done through a process known as "pairing".

"Pairing" describes a process in which the engine control circuits 12, 14, 16 store the transponder identification codes from the transponder during set up of the control system 10. The first transponder 26 is placed within range of the receiver 24 on the security control circuit 20. The security control circuit 20 relays the first transponder identification code to the engine control circuits 12, 14, 16, which then store the first transponder identification code. Once this particular first transponder identification code has been stored by the engine control circuit 12, 14, 16, it becomes the "first stored identification code". The first transponder 26 is then removed from proximity with the receiver 24. If a second transponder is provided, the second transponder is then placed within range of the receiver 24, and the second transponder identification code is relayed by the security control circuit 20 and subsequently stored by the engine control circuits 12, 14, 16. The second transponder identification code thereby becomes the "second stored identification code". While either of these transponder identification codes are in the process of being stored, the arbitrated lock status (described further herein below) of the control system 10 is known as "pairing". Pairing therefore means that the control system 10, namely the engine control circuits 12, 14, 16, are in the process of storing a transponder identification code, for example the first or second transponder identification code. In other embodiments, the security control circuit 20 is the portion of the control system 10 that stores the first and second stored identification codes. In other embodiments, only one transponder is provided and therefore only one transponder identification code is stored.

The "arbitrated lock status" is an overall description of the locked, unlocked, or pairing status of each of the engine control circuits 12, 14, 16 in the plurality whose respective engines have been turned on. When a marine engine has been turned on, its associated engine control circuit 12, 14, 16 connects to the CAN bus 18 for communication with the security control circuit 20 and the telematics circuit 30. The security control circuit 20 determines the arbitrated lock status of the control system 10 based on a conjunctive analysis of the locked and unlocked statuses of the engine control circuits 12, 14, 16 in the plurality that are connected to the CAN bus 18. This conjunctive analysis is shown as the decisions made at 128, 132, 136, and 140 of FIG. 2, as will be described further herein below. The security control circuit 20 reads a status from each engine control circuit 12, 14, 16 that is connected to the CAN bus 18 and performs a logical conjunction of the three choices for the status of the respective engine control circuit, i.e., pairing, locked, or unlocked. Optionally, the security control circuit 20 reads a fourth status choice of "error" and a fifth status choice of "off".

Figure 2:
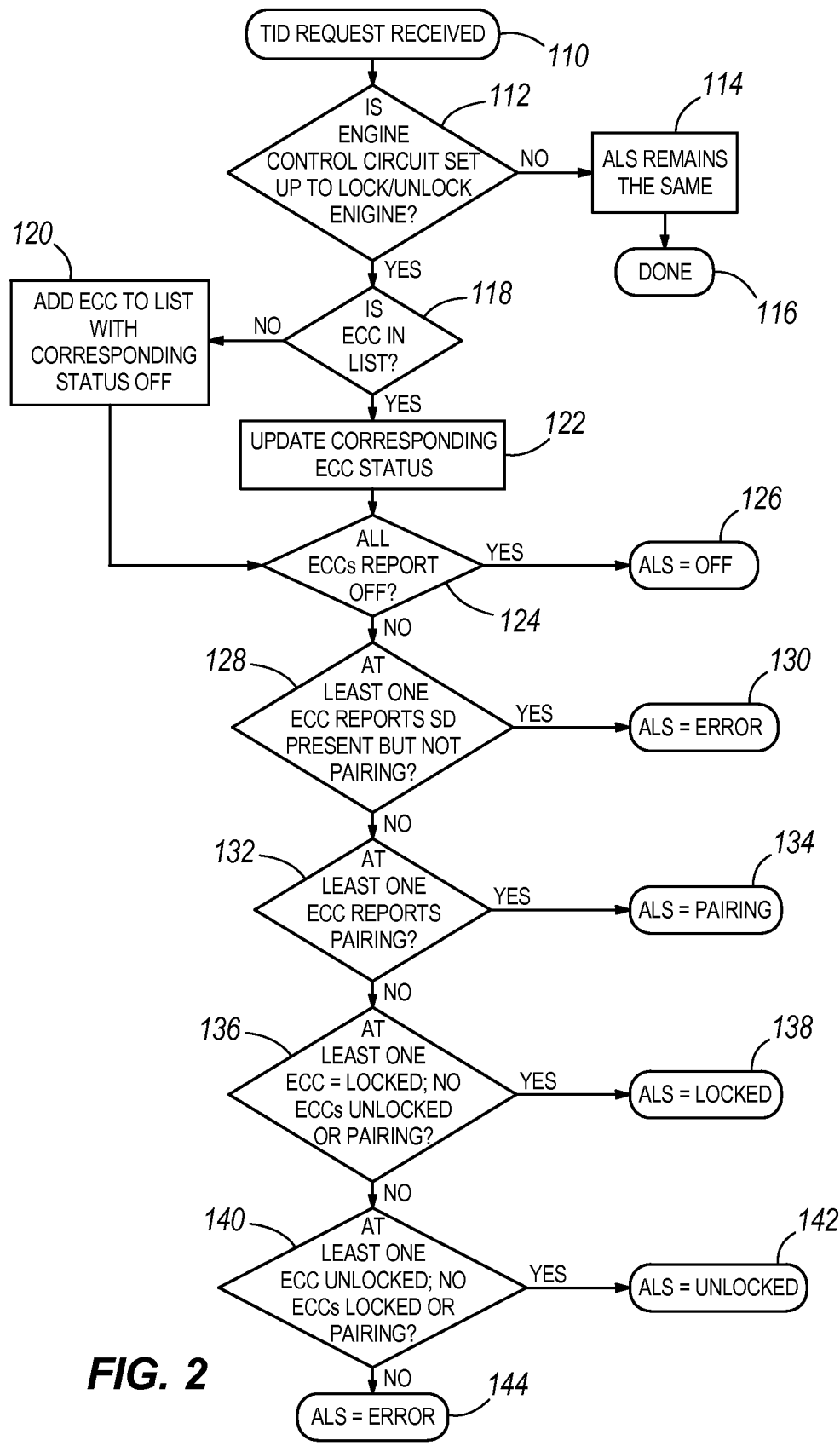
FIG. 2 is a flow chart depicting a method for deterring theft of a marine vessel according to the present disclosure.

The method of FIG. 2 is described from the reference point of the security control circuit 20. At 110, the security control circuit 20 determines whether a transponder ID (TID) request has been received. A TID request is received when a circuit, for example the engine control circuits 12, 14, 16 or the telematics circuit 30, is first turned on or "wakes up" and requests the transponder identification code from the security control circuit 20. At 112, the security control circuit 20 determines whether the circuit making the TID request is set up to lock or unlock itself to allow operation of a respective marine engine. In other words, the security control circuit 20 determines whether the circuit making the TID request is an engine control circuit 12, 14, 16 that is able to be locked or unlocked when a correct transponder identification code is received.

If the circuit making the request is not set up to lock or unlock itself to allow operation of a respective marine engine, the method continues to 114 and the arbitrated lock status (ALS) remains the same as prior to receipt of the TID request. This allows the telematics circuit 30 to ask for the status of the control system 10 without affecting the status of the control system 10. For example, if instead of an engine control circuit 12, 14, 16 requesting the transponder identification code, the telematics circuit 30 requests the transponder identification code, this can be done without affecting the outcome of the process, i.e., the telematics circuit 30 can make this request without affecting the arbitrated lock status of the control system 10. The method then continues to 116 and ends there.

If, on the other hand, the engine control circuit 12, 14, 16 is set up to lock or unlock itself to allow operation of a respective marine engine, the method continues to 118 to determine whether the engine control circuit is in a list of engine control circuits that the security control circuit 20 has communicated with or seen before. In other words, the security control circuit 20 determines whether the engine control circuit 12, 14, 16 and its respective marine engine have already been recognized by the security control circuit 20 since the security control circuit 20 has been turned on or woken up. If yes, the method continues to 122 and the security control circuit 20 updates the corresponding engine control circuit's status, which can be OFF, PAIRING, LOCKED, or UNLOCKED. If the engine control circuit 12, 14, 16 is not one that the security control circuit 20 has seen since it has woken up, the method continues to 120 and the engine control circuit 12, 14, 16 is added to the list with a corresponding status of OFF. This allows additional marine engines to be turned on while the marine vessel is underway without affecting the arbitrated lock status of the entire marine vessel. The first time the engine control circuit 12, 14, 16 wakes up, it will be locked; however, it is desirable to keep the marine vessel running normally, rather than to restrict the power of the already-operating marine engines due to a newly turned on engine control circuit 12, 14, 16 being added with a locked status. Therefore, the newly added engine control circuit 12, 14, 16 is run through the process with a status of OFF until it once again makes a TID request at 110. Now, the newly added engine control circuit 12, 14, 16 will be in the list of engine control circuits the security control circuit 20 has seen before, as determined at 118, and its status will be updated accordingly at 122.

Regardless of whether the engine control circuit 12, 14, 16 is already on the list as determined at 118 and thereafter has had its status updated at 122, or whether the engine control circuit is not already on the list as determined at 118 and has been added to the list with a corresponding status of OFF at 120, the method then continues to 124 for a determination as to whether all engine control circuits 12, 14, 16 in the list report a status of OFF. If all of the engine control circuits 12, 14, 16 report a status of OFF, then the arbitrated lock status is OFF as shown at 126. If not all engine control circuits report a status of OFF, the method continues to 128, where the security control circuit 20 determines whether at least one engine control circuit 12, 14, 16 reports that the security control circuit 20 is present, but the engine control circuit is not pairing with the security control circuit 20. If at least one engine control circuit 12, 14, 16 reports that a security control circuit 20 is present but the engine control circuit is not pairing with the security control circuit 20, then the method continues to 130 and the arbitrated lock status is ERROR. This prevents a person from removing an engine control circuit 12, 14, 16 that is installed on the marine vessel and replacing it with another engine control circuit in order to, for example, steal the marine vessel or operate it without authorization to do so.

If at 128 no engine control circuit 12, 14, 16 reports that a security control circuit 20 is present but that the engine control circuit is not pairing the with security control circuit 20, the method continues to 132 for a determination as to whether at least one engine control circuit reports that it is pairing with the security control circuit 20. If yes, the method continues to 134 and the arbitrary lock status is PAIRING.

If at 132 no engine control circuit 12, 14, 16 reports that it is pairing, the method continues to 136, where a determination is made as to whether at least one engine control circuit is locked and whether no engine control circuits are unlocked or pairing. If yes, the method continues to 138 and the arbitrated lock status is LOCKED. If no, the method continues to 140 for a determination as to whether at least one engine control circuit is unlocked and whether no engine control circuits are locked or pairing. If yes, the method continues to 142 and the arbitrated lock status is UNLOCKED. If no, then the control system 10 has a mix of locked and unlocked engine control circuits, the method continues to 144, and the arbitrated lock status is ERROR.

The engine control circuit 12, 14, 16 need not be the circuit that performs the comparison of the stored identification code with the transponder identification code. In other embodiments, the security control circuit 20 may perform the comparison of the stored identification code with the transponder identification code to determine the status of the engine control circuit 12, 14, 16.

The decisions made at 128 and 132 are only necessary during setup of the control system 10. Once all engine control circuits 12, 14, 16 in the control system 10 have stored the transponder identification code(s), the answers to 128 and 132 will both be no and the process will cascade through these steps to the determination at 136. In other words, once setup of the control system 10 (complete with the security control circuit 20) is finished, the security control circuit 20 will make determinations at 124, 136, and 140 as to whether the arbitrated lock system is off, locked, unlocked, or error.

In this way, the security control circuit 20 is able to deter theft of the marine vessel on which it is installed. For example, it is only when each of the engine control circuits 12, 14, 16 is unlocked, i.e., the arbitrated lock status is UNLOCKED as shown at 142, that the marine vessel is allowed to operate at full power. In other words, when the arbitrated lock status is unlocked, the engine control circuits 12, 14, 16 in the plurality that are connected to the network bus 18 allow normal operation of the respective marine engines.

When the arbitrated lock status is ERROR as shown at 130 or 144, PAIRING as shown at 134, or LOCKED as shown 138, the engine control circuits 12, 14, 16 in the plurality that are connected to the network bus 18 limit operation of the respective marine engines to a low power output. For example, the low power output is a forced idle of the respective marine engines. When the marine engines are limited to forced idle, the speed of the marine vessel is, for example, low enough that it produces no wake. This prevents an operator of the marine vessel from driving the marine vessel at normal speeds when the operator of the marine vessel does not have the correct transponder identification code to be able to do so. In other words, the marine vessel is prohibited from moving at normal speeds when an operator without the authorized fob has turned on the marine engines on the marine vessel.

Once the security control circuit 20 has determined the arbitrated lock status of the control system 10 based on a conjunctive analysis of the locked and unlocked statuses of the engine control circuits 12, 14, 16 in the plurality that are connected to the network bus 18, the security control circuit 20 indicates the arbitrated lock status to an operator of the marine vessel. The security control circuit 20 can do this, for example, with indicators 22a, 22b and/or an $n^{th}$ indicator 22n. These indicators 22a-22n can be, for example, LEDs that present a visual indication to the operator of the marine vessel regarding the arbitrated lock status. In other embodiments, the indicators 22a-22n could be audible, or a combination of visible and audible, or any other means of indicating the arbitrated lock status of the control system 10 to the operator. For purposes of illustration only, the indicators 22a-22n will be described as a red LED 22a and a green LED 22b.

The LEDs can provide different indications regarding the PAIRING, LOCKED, UNLOCKED, ERROR OR OFF status of the control system 10. For example, the security control circuit 20 provides a first indication to an operator of the control system 10 when the arbitrated lock status is PAIRING as shown at 134. In one embodiment, the first indication is a fast blink of the red LED 22a while the green LED 22b is off. When the arbitrated lock status is LOCKED, the security control circuit 20 provides a second indication to the operator of the control system 10 that it is different than the first indication. For example, the second indication turns the red LED 22a on while the green LED 22b is off.

When the arbitrated lock status is UNLOCKED as shown at 142, the security control circuit 20 provides a third indication to the operator of the control system 10 that is different than the first indication and different from the second indication. For example, the third indication turns the red LED 22a off while the green LED 22b is on. When the arbitrated lock status is ERROR, as shown at 130 and 144, the security control circuit 20 provides a fourth indication to the operator of the control system 10 that is different than the first indication and different than the second indication and different than the third indication. For example, the fourth indication is a slow blink of the red LED 22a while the green LED 22b remains off. When all of the marine engines are off, neither the red LED 22a nor the green LED 22b is on, thereby indicating that the control system 10 is OFF.

Figure 3:
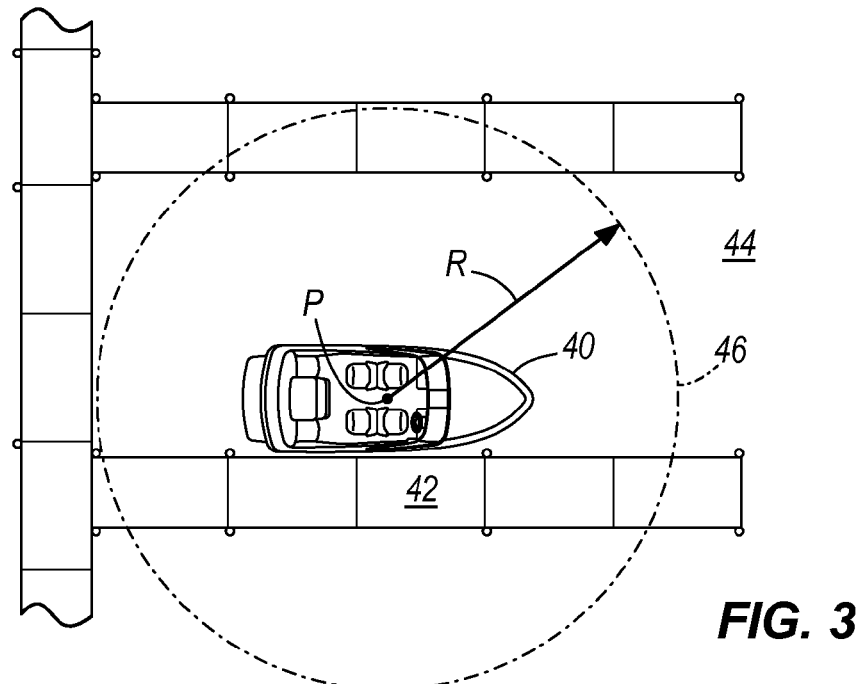
FIG. 3 is a schematic view of a virtual geographical perimeter according to the present disclosure.

Now with reference to FIGS. 3 and 4, another embodiment of a system and method for preventing theft of a marine vessel will be described. In FIG. 3 a marine vessel 40 is docked at a dock 42 in a harbor 44. The marine vessel 40 is surrounding by a generally circular virtual geographical perimeter 46. The virtual geographical perimeter can be, for example, a geofence that sends an alert when the marine vessel 40 has been outside of the virtual geographical perimeter 46 for longer than a pre-determined period of time. An alert is sent when the marine vessel 40 has left the virtual geographical perimeter 46 without being authorized to do so. The alert can be sent via the telematics circuit 30 to a person's email account and/or cell phone.

The virtual geographical perimeter 46 can be established in many ways. For example, the virtual geographical perimeter 46 can be dynamically generated at a radial distance from a point location. As shown in FIG. 3, the virtual geographical perimeter 46 is at a set radius R from a point P on the marine vessel 40. This radius R can be chosen by a person who programs the virtual geographical perimeter 46. A geo-fence can also be predefined by a set of boundaries. FIG. 4 shows an alternative embodiment of a virtual geographical perimeter 48. In this embodiment, the marine vessel 40 is situated at a dock 42 in a harbor 44. However, the virtual geographical perimeter 48 in the embodiment of FIG. 4 is set around the entire harbor 44, or a portion thereof, in accordance with the wishes of the person who programs the virtual geographical perimeter 48. The virtual geographical perimeter may be, for example, established via the telematics circuit 30.

Figure 4:
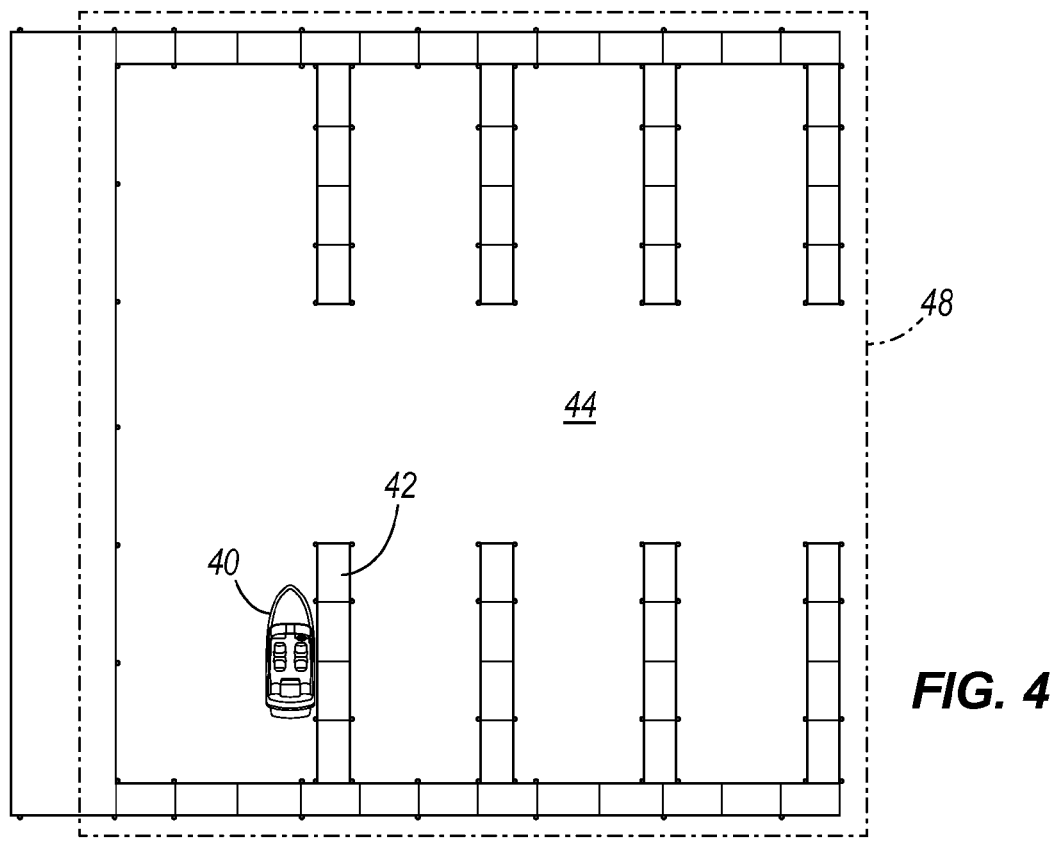
FIG. 4 is a schematic view of an alternative embodiment of a virtual geographical perimeter according to the present disclosure.

Both the embodiments of the virtual geographical perimeter 46, 48 shown in FIGS. 3 and 4 allow an operator of the marine vessel to move the marine vessel around the harbor without sending an alert regarding the position of the marine vessel 40, which allows the marine vessel 40 to be moved for purposes of storage, maintenance, and rearrangement of vessels in the harbor 44.

A virtual geographical perimeter 46, 48 can be established or removed via a command from a person operating a device that is in communication with the telematics circuit 30 and/or the monitoring center 32, shown in FIG. 1. The monitoring center 32 could be, for example, an external security service having operators who program the boundaries of the virtual geographical perimeter 46, 48. The monitoring center 32 can send the alert that the virtual geographical perimeter has been breached to a cell phone, an email account, a website, or any other means for communicating with the monitoring center 32. In other embodiments, the telematics circuit 30 is capable of limited two-way communication with a person's cell phone, email account, etc. such that the person can receive alerts and can command the telematics circuit 30 to establish or remove the virtual geographical perimeter 46, 48 without communication via the monitoring center 32.

A virtual geographical perimeter 46, 48 can also be automatically established and removed from around the marine vessel 40 based on the arbitrated lock status of the control system 10, rather than based on inputs from a person communicating with the telematics circuit 30 via a cell phone, email account, website, etc. For example, the virtual geographical perimeter 46, 48 can be established when the arbitrated lock status is not unlocked, and removed when the arbitrated lock status is unlocked. The security control circuit 20 sends a signal to the telematics circuit 30 indicating the arbitrated lock status of the control system 10, the telematics circuit 30 reads the arbitrated lock status, and the telematics circuit 30 establishes or removes the virtual geographical perimeter 46, 48 accordingly. The telematics circuit 30 can establish or remove the virtual geographical perimeter 46, 48 with or without communicating with the monitoring center 32.

The telematics circuit 30 sends an alert when the virtual geographical perimeter 46, 48 is established, the arbitrated lock status is not unlocked, and the marine vessel 40 has been outside the virtual geographical perimeter 46, 48 for longer than a pre-determined period of time. The person programming the virtual geographical perimeter 46, 48 may choose the pre-determined period of time for which the marine vessel 40 must be outside the virtual geographical perimeter 46, 48 before an alert is sent. The alert may be relayed from the telematics circuit 30 to the monitoring center 32, which can then relay the alert to a person via a cell phone, a website, or any other means for alerting a person as to the position of the marine vessel 40 with respect to the virtual geographical perimeter 46, 48. The alert can also be sent without being communicated via the monitoring center 32.

Figure 5:
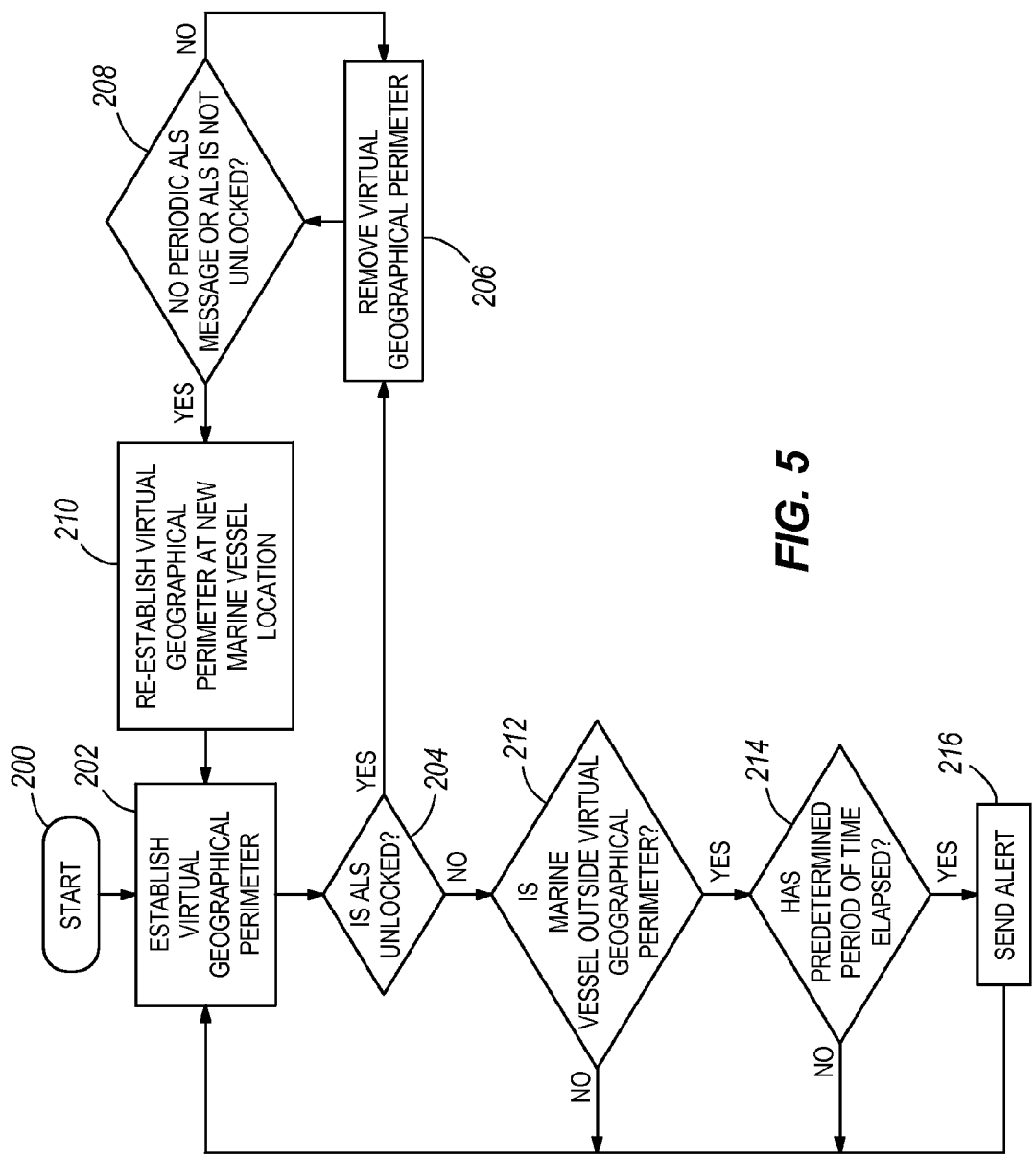
FIG. 5 is a flow chart depicting a method for deterring theft of a marine vessel by alerting a vessel owner when the vessel has left the virtual geographical perimeter.

With reference to FIG. 5, a method for deterring theft of a marine vessel 40 having an engine control circuit 12 that controls operation of a respective marine engine will now be described. The method comprises receiving with a security control circuit 20 a transponder identification code from a transponder 26. The method further comprises determining the status of the engine control circuit 12 based on a comparison of an identification code stored in the engine control circuit 12 with the transponder identification code, wherein the status of the engine control circuit 12 is locked if the stored identification code does not match the transponder identification code and wherein the status of the engine control circuit 12 is unlocked if the stored identification code does match the transponder identification code. The method further comprises establishing a virtual geographical perimeter 46, 48 around the marine vessel 40 with a telematics circuit 30 when the status of the engine control circuit 12 is not unlocked, and removing the virtual geographical perimeter 46, 48 when the status of the engine control circuit 12 is unlocked. When the virtual geographical perimeter 46, 48 is removed, the marine vessel 40 is free to travel anywhere without the possibility that an alert will be sent to a person regarding the location of the marine vessel 40. The method can be based not only on the locked or unlocked status of any one engine control circuit 12, but also on the arbitrated lock status of the entire marine vessel 40 as outlined below.

The method is described from the point of view of the telematics circuit 30 and begins at 200. At 202 the telematics circuit 30 establishes a virtual geographical perimeter 46, 48. At 204 the telematics circuit 30 reads the arbitrated lock status from the security control circuit 20, which determines whether the arbitrated lock status is unlocked. This determination can be made according to the method in FIG. 2. If the arbitrated lock status is unlocked, the method continues to 206 and the telematics circuit 30 removes the virtual geographical perimeter 46, 48. The marine vessel 40 is then allowed to travel anywhere without the possibility that an alert will be sent to a person. The method then continues to 208, where a determination is made as to whether no periodic arbitrated lock status (ALS) message is being sent from the security control circuit 20 to the telematics circuit 30, or whether the ALS is not unlocked, i.e. locked, off, or error. If the answer is no, the method cycles back to 206, where the virtual geographical perimeter 46, 48 is removed. This means that a periodic ALS message is being sent from the security control circuit 20 to the telematics circuit 30. It also means that the ALS remains unlocked.

If the determination at 208 is yes, the method continues to 210, where the telematics circuit 30 re-establishes a virtual geographical perimeter 46, 48 at a new location of the marine vessel. For example, the telematics circuit 30 re-establishes a center P of the virtual geographical perimeter 46 based on the location of the marine vessel 40 at a different dock 42. The telematics circuit 30 could also re-establish the virtual geographical perimeter 48 around a portion of a different harbor 44. The method may continue to 210 if the security control circuit 20 is not sending a periodic message to the telematics circuit 30. This may occur, for example, when the security control circuit 20 is turned off and the marine vessel 40 is not in operation. This may also occur if the security control circuit 20 has been removed from the marine vessel 40, which may be because a person is attempting to steal the marine vessel 40. The method may also continue to 210 if the ALS is not unlocked, i.e., is locked, off or error. This accords with the virtual geographical perimeter 46, 48 being established when the arbitrated lock system is not unlocked. Thereafter, the method continues to 202 and re-cycles through the decisions described herein above.

If at 204 it is determined that the arbitrated lock system is not unlocked, i.e., is locked, off or error, the method continues to 212, where a determination is made as to whether the marine vessel 40 is outside the virtual geographical perimeter 46, 48. If the marine vessel 40 is not outside the virtual geographical perimeter 46, 48, then the virtual geographical perimeter 46, 48 remains established as shown at 202. If the marine vessel 40 is outside the virtual geographical perimeter 46, 48, a determination is made as to whether a pre-determined period of time has elapsed as shown at 214. If the pre-determined period of time has not elapsed; the method cycles back through the decisions described herein above. In this way, the marine vessel 40 is allowed to leave the confines of the virtual geographical perimeter 46, 48 for less than the predetermined period of time and to reenter the virtual geographical perimeter 46, 48 without an alert being sent to a person. This is desirable if a person moving the marine vessel for maintenance purposes accidentally leaves the virtual geographical perimeter 46, 48 for a short period of time. If it is determined at 214 that the pre-determined period of time has elapsed, then an alert is sent to a person that the marine vessel 40 has been outside the virtual geographical perimeter 46, 48 for longer than the pre-determined period of time, as shown at 216. In this way, a person is alerted as to the fact that the marine vessel 40 may be in the process of being stolen.

In other embodiments of the systems and methods described above, a service tool circuit 28 may be provided for communication with the control system 10. The service tool circuit 28 causes the engines control circuits 12, 14, 16 to unlearn the first and second stored identification codes and to store third and fourth transponder identification codes provided by third and fourth transponders, respectively. The service tool circuit 28 can be used, therefore, when an operator has lost one or more of his transponders and needs to reset the control system 10 to have the engine control circuits 12, 14, 16 store new stored identification codes for communication with new transponders having new transponder identification codes.

In the above description certain terms have been used for brevity, clearness and understanding. No unnecessary limitations are to be implied therefrom beyond the requirement of the prior art because such terms are used for descriptive purposes only and are intended to be broadly construed. The different systems and methods described herein above may be used in alone or in combination with other systems and methods. Various equivalents, alternatives and modifications are possible within the scope of the appended claims. Each limitation in the appended claims is intended to invoke interpretation under 35 USC §112, sixth paragraph only the terms "means for" or "step for" are explicitly recited in the respective limitation. While each of the method claims includes a specific series of steps for accomplishing certain control system functions, the scope of this disclosure is not intended to be bound by the literal order or literal content of steps described herein, and non-substantial differences or changes still fall within the scope of the disclosure.

What is claimed is:

1. A control system for deterring theft of a marine vessel having a plurality of engine control circuits that are selectively connectable to a network bus, each engine control circuit controlling operation of a respective marine engine in a plurality of marine engines, the control system comprising:
   a security control circuit that receives a first transponder identification code from a first transponder;
   wherein each engine control circuit has a first stored identification code;
   wherein each engine control circuit that is connected to the network bus has an individual status that is based on a comparison of the first stored identification code with the first transponder identification code;
   wherein the individual status of the engine control circuit is locked if the first stored identification code does not match the first transponder identification code and wherein the individual status of the engine control circuit is unlocked if the first stored identification code does match the first transponder identification code; and
   wherein the security control circuit performs a conjunctive analysis of each of the individual locked and unlocked statuses of each of the engine control circuits in the plurality of engine control circuits that are connected to the network bus so as to determine an overall arbitrated lock status of the control system, and in response to an outcome of the conjunctive analysis, generates an indication specifying the arbitrated lock status to an operator of the marine vessel.

2. A control system according to claim 1, further comprising a receiver on the marine vessel receiving the first transponder identification code, wherein the security control circuit relays the first transponder identification code front the receiver to each engine control circuit that is connected to the network bus.

3. A control system according to claim 1, wherein the security control circuit receives from a second transponder a second transponder identification code that is different than the first transponder identification code, and wherein each engine control circuit in the plurality of engine control circuits has a second stored identification code.

4. A control system according to claim 3, wherein the first and second transponder identification codes are stored by the engine control circuits as the first and second stored identification codes, respectively, during setup of the control system.

5. A control system according to claim 4, wherein the arbitrated lock status is pairing when at least one of the engine control circuits in the plurality of engine control circuits is in the process of storing one of the first and second transponder identification codes.

6. A control system according to claim 5, wherein when the arbitrated lock status is pairing, the security control circuit provides a first indication to the operator of the marine vessel.

7. A control system according to claim 6, wherein the arbitrated lock status is locked if at least one of the engine control circuits in the plurality of engine control circuits has a locked status and none of the engine control circuits has an unlocked status and none of the engine control circuits has a pairing status.

8. A control system according to claim 7, wherein when the arbitrated lock status is locked, the security control circuit provides a second indication to the operator of the marine vessel that is different than the first indication.

9. A control system according to claim 8, wherein the arbitrated lock status is unlocked if at least one of the engine control circuits in the plurality of engine control circuits has an unlocked status and none of the engine control circuits has a locked status and none of the engine control circuits has a pairing status.

10. A control system according to claim 9, wherein when the arbitrated lock status is unlocked, the security control circuit provides a third indication to the operator of the marine vessel that is different than the first indication and different than the second indication.

11. A control system according to claim 10, wherein the arbitrated lock status is error when at least one of the engine control circuits in the plurality of engine control circuits has a locked status and at least one of the engine control circuits in the plurality of engine control circuits has an unlocked status.

12. A control system according to claim 11, wherein when the arbitrated lock status is error, the security control circuit provides a fourth indication to the operator of the marine vessel that is different than the first indication and different than the second indication and different than the third indication.

13. A control system according to claim 9, wherein when the arbitrated lock status is unlocked, the engine control circuits in the plurality of engine control circuits that are connected to the network bus allow normal operation of the respective marine engines.

14. A control system according to claim 13, wherein when the arbitrated lock status is locked, the engine control circuits in the plurality of engine control circuits that are connected to the network bus limit operation of the respective marine engines to a low power output.

15. A control system according to claim 14, wherein the low power output is a forced idle.

16. A control system according to claim 1, further comprising, a telematics circuit that reads the arbitrated lock status.

17. A control system according to claim 16, wherein the telematics circuit establishes a virtual geographical perimeter around the marine vessel based on a determination that the arbitrated lock status is not unlocked and removes the virtual geographical perimeter based on a determination that the arbitrated lock status is unlocked.

18. A control system according to claim 17, wherein the telematics circuit sends an alert when the virtual geographical perimeter is established, the arbitrated lock status is not unlocked, and the marine vessel has been outside the virtual geographical perimeter for longer than a predetermined period of time.

19. A control system according to claim 4, further comprising a service tool circuit that causes the engine control circuits to unlearn the first and second stored identification codes and to store third and fourth transponder identification codes provided by third and fourth transponders, respectively.

20. A control system according to claim 9, wherein when the arbitrated lock status is unlocked, the Status remains as such until the respective marine engines are shut off.

21. A control system according to claim 1, wherein the indication is one or both of a visual and audible indication generated by the security control circuit.

22. A method for deterring theft of a marine vessel having a control system including a plurality of engine control circuits, each engine control circuit in the plurality of engine control circuits being selectively connectable to a network bus and controlling operation of a respective marine engine in a plurality of marine engines, the method comprising:
receiving with a security control circuit a transponder identification code from a transponder;
determining a status of an engine control circuit based on a comparison of an identification code stored in the engine control circuit with the transponder identification code, wherein the status of the engine control circuit is locked if the stored identification code does not match the transponder identification code and wherein the status of the engine control circuit is unlocked if the stored identification code does match the transponder identification code;
determining an overall arbitrated lock status of the control system by performing a conjunctive analysis that takes into account all of the locked and unlocked statuses of all of the engine control circuits in the plurality of engine control circuits that are connected to the network bus; and
in response to an outcome of the conjunctive analysis, generating an indication specifying the arbitrated lock status to an operator of the marine vessel.

23. A method according to claim 22, further comprising relaying the transponder identification code to each engine control circuit that is connected to the network bus.

24. A method according to claim 22, further comprising storing the transponder identification code as the stored identification code.

25. A method according to claim 24, wherein the arbitrated lock status is pairing when at least one of the engine control circuits in the plurality of engine control circuits is in the process of storing the transponder identification code.

26. A method according to claim 25, further comprising providing a first indication to the operator of the marine vessel when the arbitrated lock status is pairing.

27. A method according to claim 26, wherein the arbitrated lock status is locked if at least one of the engine control circuits in the plurality of engine control circuits has a locked status and none of the engine control circuits has an unlocked status and none of the engine control circuits has a pairing status.

28. A method according to claim 27, further comprising providing a second indication to the operator of the marine vessel that is different than the first indication when the arbitrated lock status is locked.

29. A method according to claim 28, wherein the arbitrated lock status is unlocked if at least one of the engine control circuits in the plurality of engine control circuits has an unlocked status and none of the engine control circuits has a locked status and none of the engine control circuits has a pairing status.

30. A method according to claim 29, further comprising providing a third indication to the operator of the marine vessel that is different than the first indication and different than the second indication when the arbitrated lock status is unlocked.

31. A method according to claim 30, wherein the arbitrated lock status is error when at least one of the engine control circuits in the plurality of engine control circuits has a locked status and at least one of the engine control circuits in the plurality of engine control circuits has an unlocked status.

32. A method according to claim 31, further comprising providing a fourth indication to the operator of the marine vessel that is different than the first indication and different than the second indication and different than the third indication when the arbitrated lock status is error.

33. A method according to claim 29, further comprising allowing normal operation of the respective marine engines when the arbitrated lock status is unlocked.

34. A method according to claim 33, further comprising, limiting operation of the respective marine engines to a low power output when the arbitrated lock status is locked.

35. A method according to claim 34, wherein the low power output is a forced idle.

36. A method according to claim 29, further comprising providing a telematics circuit that establishes a virtual geographical perimeter around the marine vessel.

37. A method according to claim 36, further comprising removing the virtual geographical perimeter when the arbitrated lock status is unlocked.

38. A method according, to claim 37, further comprising determining whether a periodic message from the security control circuit is being sent to the telematics circuit, and re-establishing the virtual geographical perimeter at a new location of the marine vessel if no such periodic message is being sent.

39. A method according to claim 38, limber comprising sending an alert when the virtual geographical perimeter is established, the arbitrated lock status is not unlocked, and the marine vessel has been outside the virtual geographical perimeter for longer than a predetermined period of time.

40. A method for deterring theft of a marine vessel having a plurality of engine control circuits, each engine control circuit controlling operation of a respective marine engine in a plurality of marine engines, the method comprising:
   receiving with a security control circuit a transponder identification code from a transponder;
   determining an individual status of each engine control circuit based on a comparison of an identification code stored in each engine control circuit with the transponder identification code, wherein the individual status of the engine control circuit is locked if the stored identification code does not match the transponder identification code and wherein the individual status of the engine control circuit is unlocked if the stored identification code does match the transponder identification code;
   performing a conjunctive analysis of each of the individual locked and unlocked statuses of each of the engine control circuits in the plurality of engine control circuits so as to determine an overall arbitrated lock status, and in response to an outcome of the conjunctive analysis, generating an indication specifying the arbitrated lock status to an operator of the marine vessel; and
   automatically establishing a virtual geographical perimeter around the marine vessel with a telematics circuit based on a determination that the arbitrated lock status is not unlocked and automatically removing the virtual geographical perimeter based on a determination that the arbitrated lock status is unlocked.

41. A method according to claim 40, further comprising relaying the transponder identification code to each engine control circuit in the plurality of engine control circuits.

42. A method according to claim 40, further comprising determining whether a periodic message from the security control circuit is being sent to the telematics circuit, and re-establishing the virtual geographical perimeter at a new location of the marine vessel if no such periodic message is being sent.

43. A method according to claim 42, further comprising sending an alert when the virtual geographical perimeter is established, the arbitrated lock status is not unlocked, and the marine vessel has been outside the virtual geographical perimeter for longer than a predetermined period of time.

44. A control system for deterring theft of a marine vessel having a plurality of engine control circuits, each engine control circuit controlling operation of a respective marine engine in a plurality of marine engines, the control system comprising:
   a security control circuit that receives a transponder identification code from a transponder;
   wherein each engine control circuit has a stored identification code;
   wherein the security control circuit determines an individual status of each engine control circuit by comparing each stored identification code with the transponder identification code;
   wherein the individual status of the engine control circuit is locked if the stored identification code does not match the transponder identification code and wherein the individual status of the engine control circuit is unlocked if the stored identification code does match the transponder identification code;
   wherein the security control circuit performs a conjunctive analysis of each of the individual locked and unlocked statuses of each of the engine control circuits in the plurality of engine control circuits so as to determine an overall arbitrated lock status, and in response to an outcome of the conjunctive analysis, generates an indication specifying the arbitrated lock status to an operator of the marine vessel; and
   wherein a telematics circuit automatically establishes a virtual geographical perimeter around the marine vessel based on a determination that the arbitrated lock status is not unlocked and removes the virtual geographical perimeter based on a determination that the arbitrated lock status is unlocked.

45. A control system according to claim 44, wherein the telematics circuit determines whether a periodic message is being sent from the security control circuit, and re-establishes the virtual geographical perimeter at a new location of the marine vessel if no such periodic message is being sent.

46. A control system according to claim 45, wherein the telematics circuit sends an alert when the virtual geographical perimeter is established, the arbitrated lock status is not unlocked, and the marine vessel has been outside the virtual geographical perimeter for longer than a predetermined period of time.

* * * * *

UNITED STATES PATENT AND TRADEMARK OFFICE
CERTIFICATE OF CORRECTION

PATENT NO. : 9,284,032 B1  
APPLICATION NO. : 13/605566  
DATED : March 15, 2016  
INVENTOR(S) : Matthew W. Snyder and Thomas S. Kirchhoff It is certified that error appears in the above-identified patent and that said Letters Patent is hereby corrected as shown below:

In the claims

In claim 2, at column 12, line 55, "front" should instead read --from--.

In claim 16, at column 13, line 57, delete the "," between "comprising" and "a".

In claim 20, at column 14, line 10, "Status" should instead read --status--.

In claim 34, at column 15, line 22, delete the "," between "comprising" and "limiting".

In claim 38, at column 15, line 33, delete the "," between "according" and "to".

In claim 39, at column 15, line 39, "limber" should instead read --further--.

Signed and Sealed this  
Thirty-first Day of May, 2016

Michelle K. Lee  
*Director of the United States Patent and Trademark Office*